United States Patent
Turner (10) Patent No.: US 9,550,585 B2
(45) Date of Patent: Jan. 24, 2017

(54) HIGHLY INCLINED ELLIPTICAL ORBIT DE-ORBIT TECHNIQUES

(71) Applicant: Space Systems/Loral, LLC, Palo Alto, CA (US)

(72) Inventor: Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 117 days.

(21) Appl. No.: 14/300,032

(22) Filed: Jun. 9, 2014

(65) Prior Publication Data

US 2015/0353209 A1    Dec. 10, 2015

(51) Int. Cl.
*B64G 1/24*    (2006.01)
*B64G 1/10*    (2006.01)
*B64G 1/26*    (2006.01)

(52) U.S. Cl.
CPC ............... *B64G 1/242* (2013.01); *B64G 1/10* (2013.01); *B64G 1/26* (2013.01)

(58) Field of Classification Search
CPC ........... B64G 1/242; B64G 1/10; B64G 1/002; B64G 1/26
See application file for complete search history.

(56) References Cited

U.S. PATENT DOCUMENTS

| 5,326,054 A | 7/1994 | Turner | |
|---|---|---|---|
| 5,507,454 A * | 4/1996 | Dulck | H04B 7/195 244/158.5 |
| 5,687,084 A * | 11/1997 | Wertz | B64G 1/24 244/164 |
| 7,720,604 B1 * | 5/2010 | Cichan | G05D 1/0883 244/158.4 |

(Continued)

FOREIGN PATENT DOCUMENTS

| WO | WO 03/061141 | 7/2003 |
|---|---|---|
| WO | WO 2012/040828 | 4/2012 |

OTHER PUBLICATIONS

Riishojgaard, "Report on Molniya Orbits", World Meteorological Organization, Commission for Basic Systems, Expert Team on Observational Data Requirements and Redesign of the Global Observing System, Seventh Session, Geneva, Switzerland, Jul. 12-16, 2004, 4 pages.

(Continued)

*Primary Examiner* — Valentina Xavier
(74) *Attorney, Agent, or Firm* — Weaver Austin Villeneuve & Sampson LLP (57) ABSTRACT

Techniques for deorbiting a satellite include executing an orbit transfer maneuver that transfers the satellite from an operational orbit to an interim orbit. The operational orbit is substantially geosynchronous and has (i) an inclination of greater than 70 degrees; (ii) a nominal eccentricity in the range of 0.25 to 0.5; (iii) an argument of perigee of approxi- (Continued)

mately 90 or approximately 270 degrees; (iv) a right ascension of ascending node of approximately 0; and (v) an operational orbit apogee altitude. The interim orbit has an initial second apogee altitude that is at least 4500 km higher than the first apogee altitude, and the interim orbit naturally decays, subsequent to the orbit transfer maneuver, such that the satellite will reenter Earth's atmosphere no longer than 25 years after completion of the orbit transfer maneuver.

20 Claims, 11 Drawing Sheets

(56) References Cited

U.S. PATENT DOCUMENTS

| 2002/0177403 | A1* | 11/2002 | LaPrade | H04B 7/195 |
| | | | | 455/12.1 |
| 2004/0211864 | A1* | 10/2004 | Less | H04B 7/195 |
| | | | | 244/158.4 |
| 2012/0119034 | A1* | 5/2012 | Kemper | B64G 1/242 |
| | | | | 244/158.5 |
| 2014/0017992 | A1 | 1/2014 | Bigras et al. | |

OTHER PUBLICATIONS

Riishojgaard, "The Case for Launching a Meteorological Imager in a Molniya Orbit", Global Modeling and Assimilation Office, 8 pages.

* cited by examiner

HIGHLY INCLINED ELLIPTICAL ORBIT DE-ORBIT TECHNIQUES

TECHNICAL FIELD

This invention relates generally to spacecraft and, in particular, to techniques for de-orbiting a satellite at the end of its useful life from a highly inclined elliptical orbit.

BACKGROUND

The assignee of the present invention manufactures and deploys spacecraft for, commercial, defense and scientific missions. Many such spacecraft operate in a geosynchronous orbit having a period equal to one sidereal day (approximately 23.93 hours).

A particular type of geosynchronous orbit is a geostationary orbit (GSO), characterized as being substantially circular and co-planar with the Earth's equator. The nominal altitude (the "GEO altitude) of a GSO is approximately 35,786 km. An elevation angle from a user located on the Earth to a satellite in GSO is a function of the user's latitude. When a service area on the ground intended to receive communications or broadcast services (hereinafter, an "intended service area") is at a north or south latitude above approximately 60 to 70 degrees, the elevation angle is small enough that service quality is significantly impaired.

To mitigate this problem, satellites operable in highly inclined, highly elliptical geosynchronous orbits have been proposed, as described, for example in Bigras, et al., US Pat. Pub. 2014/0017992 (hereinafter, Bigras) the disclosure of which is hereby incorporated in its entirety into the present patent application. A geosynchronous, highly inclined, elliptical orbit (HIEO) may be selected such that the orbit's apogee is located at a pre-selected, substantially constant, longitude and latitude. A satellite operating in an HIEO can, during much of its orbital period (e.g., sixteen hours out of twenty four) enable higher elevation angles to a user than a GSO satellite.

An HIEO orbit such as the one disclosed by Bigras, has an apogee altitude of about 48,000 km or higher and a perigee altitude of about 23,000 km. Where the intended service area is in the northern hemisphere, the argument of perigee (the angle in the orbital plane measured, in the direction of satellite motion, from the orbit's ascending node to the orbit perigee) for such an orbit is desirably about 270 degrees. With an argument of perigee of 270 degrees, the orbit apogee is located above the northern hemisphere and the orbit perigee is located above the southern hemisphere. Where the intended service area is in the southern hemisphere, the argument of perigee is desirably about 90 degrees. With an argument of perigee of 90 degrees, the orbit apogee is located above the southern hemisphere and the orbit perigee is located above the northern hemisphere.

Orbital debris has become a major concern in recent years. One type of orbital "debris" includes entire satellites that have been retired after the end of their operational life. To mitigate the risk that retired satellites may otherwise pose to operational satellites located in high value orbits such as GSO and low earth orbit (LEO), rules have been promulgated requiring safe disposal of satellites at end of operational life. For example, the U.S. Government Orbital Debris Mitigation Standard Practices require disposal of satellites, at end-of-life, into orbits that (i) are higher than GSO; or (ii) will result in reentry into the Earth's atmosphere within 25 years of end of operational life (EOL). Similar requirements have been incorporated into international orbital debris mitigation guidelines promulgated by the Inter-Agency Space Debris Coordination Committee (IADC) and the United Nations.

There are several known methods to accomplish satellite deorbiting. One method is to maneuver the satellite into an orbit which results in the satellite's prompt reentry into the Earth's atmosphere. This is generally impractical for a satellite initially operating in high energy orbits such as GSO and geosynchronous HIEO, because the energy required for such a maneuver is prohibitive. A second method is to place the satellite in a stable orbit above GSO altitude. This is also problematic for a satellite initially in a geosynchronous HIEO, due at least to the energy cost of raising perigee from 23,000 km to an altitude above GSO.

Thus, improved techniques for deorbiting such satellites are desirable.

SUMMARY

The present inventor has appreciated that disposal, at or after EOL, of a satellite previously operational in a geosynchronous HIEO may be carried out by raising apogee altitude by at least 4500 km. The orbit raising may be accomplished by imparting an approximately 65 m/sec velocity change proximate to orbit perigee in the direction of orbital motion. Other orbital parameters, including perigee height, inclination, and right ascension of the ascending node (RAAN) may be left substantially unchanged, or changed only incidentally with the increase in apogee height. The inventor has discovered that, as a result of the increased apogee altitude, influence of the moon's gravitational field on long term orbital parameters is increased sufficiently to insure reentry of the satellite into the Earth's atmosphere at orbit perigee within 25 years, without a need to expend any additional propellant or otherwise control the satellite.

In some implementations, an earth-orbiting satellite is deorbited by: executing a first orbit transfer maneuver that transfers the satellite from an operational orbit to a first interim orbit. The operational orbit is substantially geosynchronous and has (i) an inclination of greater than 70 degrees; (ii) a nominal eccentricity in the range of 0.25 to 0.5; (iii) an argument of perigee of approximately 90 or approximately 270 degrees; (iv) a right ascension of ascending node of approximately 0; and (v) an operational orbit apogee altitude. The first interim orbit has an initial second apogee altitude that is at least 4500 km higher than the first apogee altitude, and the interim orbit naturally decays, subsequent to the orbit transfer maneuver, such that the satellite will reenter Earth's atmosphere no longer than 25 years after completion of the orbit transfer maneuver.

In some implementations, executing the first orbit transfer maneuver may include increasing the satellite velocity, proximate to orbit perigee, by more than 60 m/sec.

In some implementations, executing the orbit transfer maneuver may include increasing the satellite velocity, proximate to orbit perigee, by approximately 65 m/sec.

In some implementations, the first interim orbit may have an initial second apogee altitude that is approximately 5000 km higher than the operational orbit apogee altitude.

In some implementations, the right ascension of ascending node may be 0+/−20 degrees.

In some implementations, the operational orbit may have an orbital period of approximately 23.93 hours.

In some implementations, executing the first orbit transfer maneuver may include at least one firing of a chemical or electric thruster proximate to orbit perigee.

In some implementations, executing the first orbit transfer maneuver may include a plurality of thruster firings.

In some implementations, deorbiting the satellite may include executing, following a period of time in which the first interim orbit is allowed to decay, a second orbit transfer maneuver that transfers the satellite from the decayed first interim orbit to a second interim orbit, wherein the decayed first interim orbit has an ascending node radius less than 42,160 km and the second interim orbit has an ascending node radius greater than 42,170 km. Executing the second orbit transfer maneuver may include increasing the satellite velocity, proximate to orbit perigee, by approximately 7 m/sec.

In some implementations, an earth-orbiting satellite includes a propulsion subsystem and a spacecraft controller. The spacecraft controller is configured to cause the propulsion subsystem to execute a first orbit transfer maneuver that transfers the satellite from an operational orbit to an interim orbit. The operational orbit is substantially geosynchronous and has (i) an inclination of greater than 70 degrees; (ii) a nominal eccentricity in the range of 0.25 to 0.5; (iii) an argument of perigee of approximately 90 or approximately 270 degrees; (iv) a right ascension of ascending node of approximately 0; and (v) an operational orbit apogee altitude. The interim orbit has an initial second apogee altitude that is at least 4500 km higher than the first apogee altitude, and the interim orbit naturally decays, subsequent to the first orbit transfer maneuver, such that the satellite will reenter Earth's atmosphere no longer than 25 years after completion of the first orbit transfer maneuver.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The present disclosure relates to EOL disposal strategies beneficial for a satellite initially in a geosynchronous operational orbit that has a moderate to high eccentricity (from about 0.25 to 0.35) and high inclination (from about 70 degrees to 90 degrees). Such an operational orbit is referred to herein as a geosynchronous HIEO. To maintain a satellite in a geosynchronous HIEO orbit requires periodic orbit maintenance or "stationkeeping" maneuvers.

For example, a rotational drift of the orbit's argument of perigee, caused mainly by the Earth's oblateness (the Earth's equatorial radius being approximately 21 km greater than its polar radius), may be corrected by periodically executing "delta-v" maneuvers where delta-v refers to a velocity increment provided by, for example, firing one or more thrusters on board the satellite. Annually, about 70 m/s of delta-v must be provided to counteract disturbing influences (including gravitational influence of the moon and sun as well as the Earth's oblateness).

Figure 1:
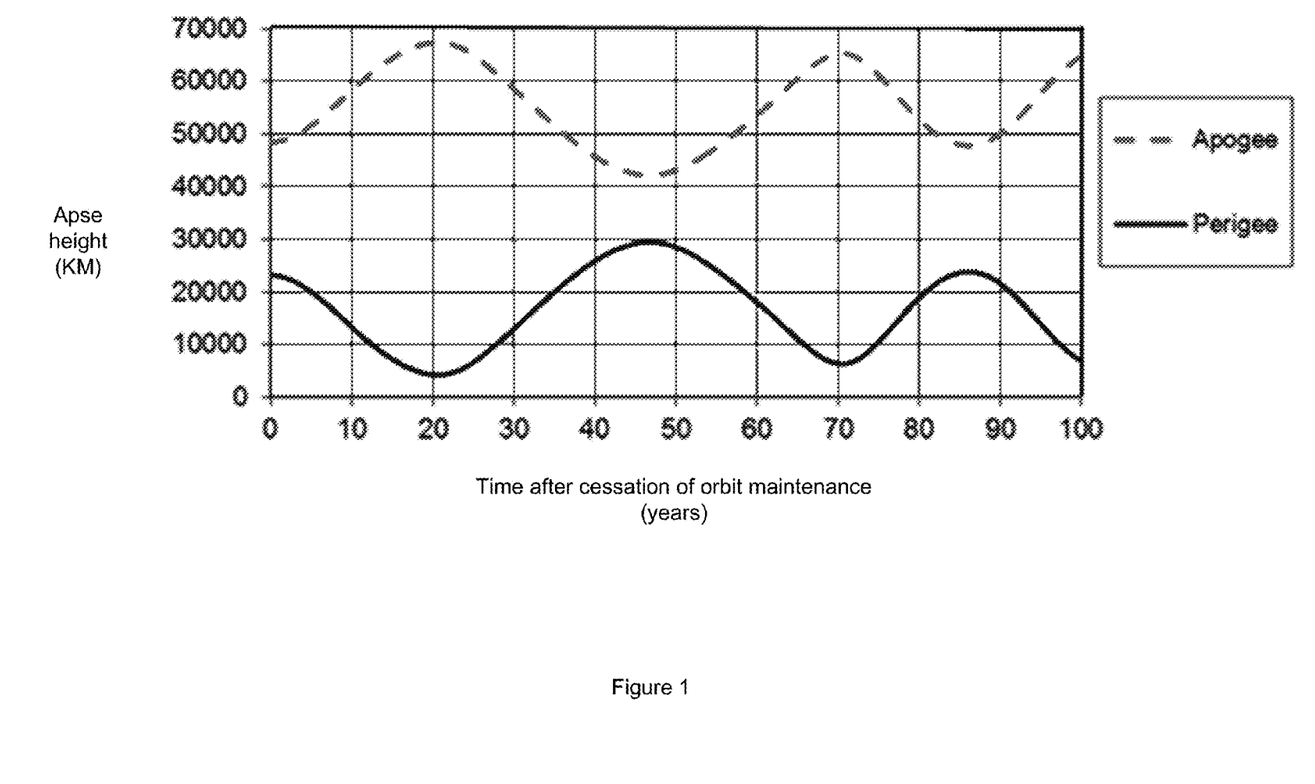
FIG. 1 illustrates orbital parameters of a satellite initially in an HIEO as a function of time in the absence of orbit maintenance maneuvers.

Referring now to FIG. 1, orbital parameters are illustrated as a function of time in the absence of orbit maintenance maneuvers. It will be observed that the altitude of the orbit's perigee apse and the altitude of the orbit's apogee apse both oscillate in a complex manner, driven mainly by gravitational forces of the moon and sun, the effects of which vary also as a function of the orbit's inclination and argument of perigee. Simulations have shown that perigee altitude will exceed the height (approximately 100-130 km) at which atmospheric drag is sufficient to deorbit the satellite for at least 100 years, significantly longer than the 25 year period contemplated by the U.S. Government Orbital Debris Mitigation Standard Practices.

As indicated above, a geosynchronous HIEO orbit contemplated by the present disclosure may have an apogee altitude of about 48,000 km or higher and a perigee altitude of about 23,000 km. As a result, the satellite, on a twice daily basis, will cross the GSO altitude of approximately 35,786 km. During the satellite's operational life, these crossings never occur proximate to the equator, and therefore do not represent a risk to satellites operating in GSO. After cessation of orbit maintenance, however, referring now to FIG. 2, there will be several occasions, in the absence of an appropriate deorbit strategy, when a retired spacecraft initially in a geosynchronous HIEO orbit will pose a distinct threat to spacecraft operating in GSO. The dangerous periods occur whenever an equatorial plane ascending or descending node occurs at a GSO altitude, which, in the illustrated example, may be expected to occur at approximately 2, 42, 45, 84 and 88 years after cessation of orbit maintenance maneuvers.

A known technique to eliminate the danger of collisions with spacecraft operating in GSO is to transfer the HIEO satellite, at EOL, from the geosynchronous HIEO to an orbit with an apogee below GSO altitude. For example, a retrograde delta-v maneuver (directed opposite to the direction of orbital motion) performed near orbit perigee will reduce the apogee altitude. However, such an approach requires a delta-V of about 350 m/sec, roughly equivalent to five years of stationkeeping, which implies a very significant launch mass penalty and still fails to comply with the requirement of U.S. Government Orbital Debris Mitigation Standard Practices to assure reentry into Earth's atmosphere within 25 years of EOL.

Figure 3:
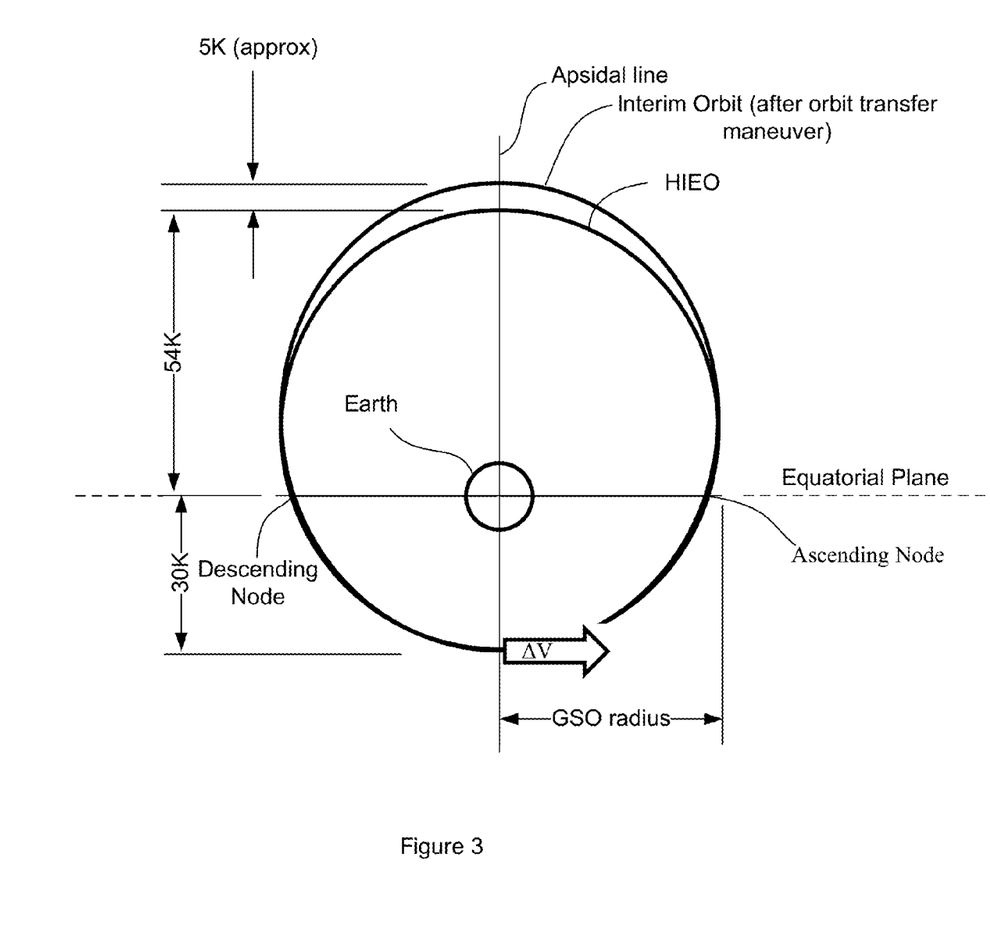
FIG. 3 illustrates an example implementation of transferring a satellite from an HIEO to an interim orbit having a raised apogee.

The presently disclosed techniques, by contrast, include executing an orbit transfer maneuver such that a relatively modest delta-V of about 65 m/sec (equivalent to less than one year of stationkeeping) is imparted in the prograde direction near orbit perigee so as to raise orbit apogee, as illustrated in FIG. 3. The present inventor has discovered that the resulting interim orbit will, in the absence of further orbit maintenance maneuvers, naturally result in a gradual lowering of perigee such that the satellite reenters Earth's atmosphere in less than 25 years after completion of the orbit transfer maneuver. In accordance with the present teachings, subsequent to the orbit transfer maneuver, there is no need to expend propellant to either change or maintain other orbital parameters, such as inclination, perigee altitude or argument of perigee.

Figure 4:
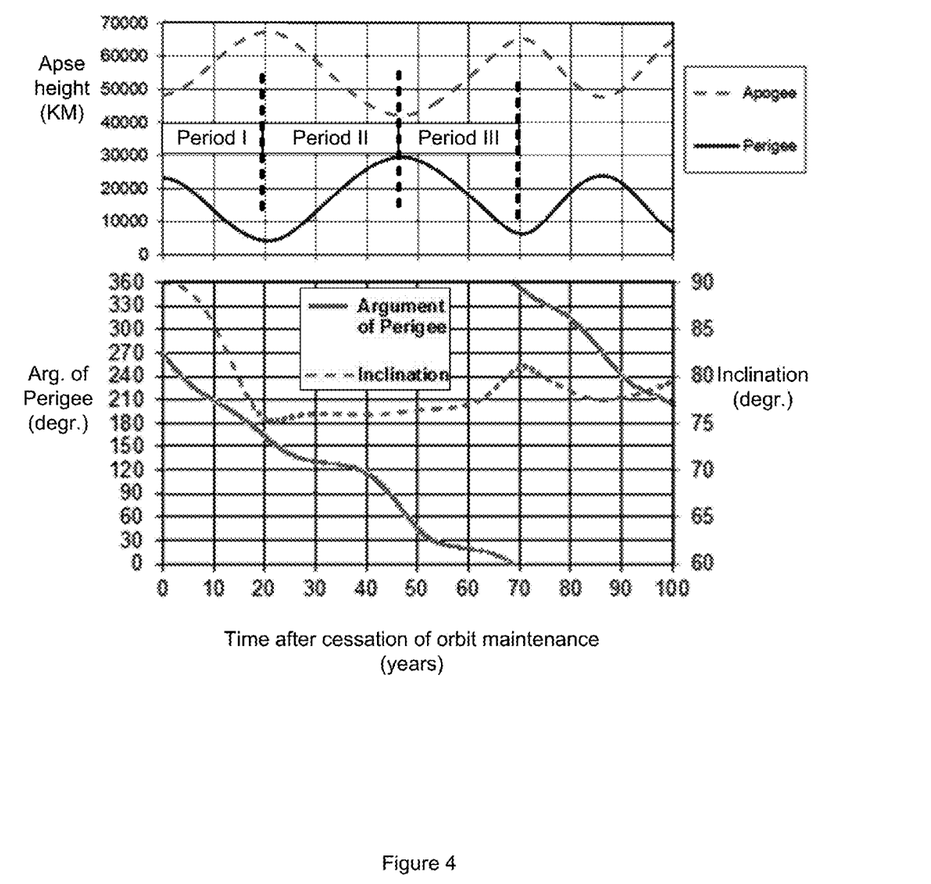
FIG. 4 illustrates orbital parameters of a satellite initially in an HIEO as a function of time in the absence of orbit maintenance maneuvers.

A better understanding of the presently disclosed techniques may be obtained by referring to FIG. 4, which shows, on a single time axis, altitude of the orbit's perigee apse and the altitude of the orbit's apogee apse (upper plots) and orbital inclination and argument of perigee (lower plots) as a function of time. The illustrated simulation relates to a case where orbit maintenance is ceased at EOL, without performing the above-described orbit transfer maneuver. Thus, the upper plots present the same information as FIG. 1. The orbital parameters at the start of the plots assume a starting orbit eccentricity of 0.3, inclination of 90 degrees, and right ascension of the ascending node (RAAN) of 0 (360) degrees. It will be observed that, in the absence of stationkeeping, the argument of perigee rotates, due to the Earth's oblateness, at a rate averaging about minus 5.5 degrees per year.

A characteristic oscillation in altitude of orbit perigee apse and of orbit apogee apse may be observed and related to the rotation in the argument of perigee. More particularly, during the first approximately 18 years after cessation of orbit maintenance, the argument of perigee rotates from 270 degrees to about 180 degrees. During this time ("Period I"), perigee altitude decreases from about 24000 km to about 4000 km. As the argument of perigee rotates through 180 degrees toward 90 degrees ("Period II"), perigee altitude increases, reaching a maximum height of about 30,000 km about 45 years after cessation of orbit maintenance. Subsequently, perigee altitude declines again as the argument of perigee rotates through 90 degrees toward 0 (360) degrees ("Period III").

Figure 5:
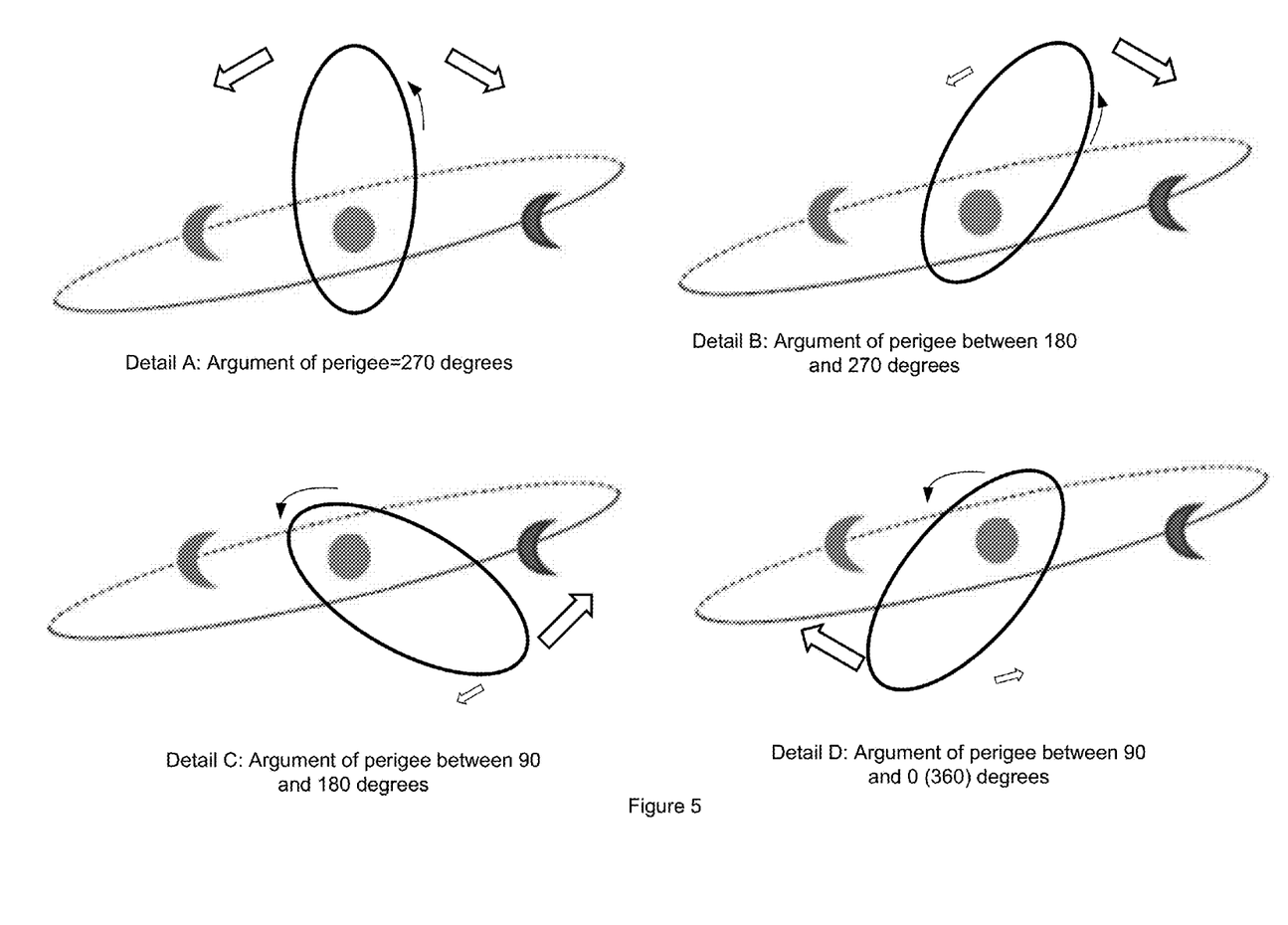
FIG. 5 illustrates the effect of argument of perigee on the moon's gravitational influence.

The observed oscillations in perigee altitude are primarily a result of the moon's gravitational influence. FIG. 5 illustrates the time varying effect of argument of perigee on the moon's gravitational influence. It will be appreciated that FIG. 5 is drawn, for ease of explanation, in a stylized manner with a distorted scale. Referring to Detail A of FIG. 5, when the orbit has an argument of perigee of 270 degrees (as is generally maintained during the satellites' operational life), the moon's gravity works with approximately equal and (on average) offsetting effect to retard and accelerate the satellite as the moon revolves about the Earth. However, turning to Detail B of FIG. 5, as the argument of perigee rotates, due to the Earth's oblateness, from 270 degrees toward 180 degrees the moon's gravitational influence (due to relative proximity) is stronger to retard satellite velocity proximate to orbit apogee than to accelerate satellite velocity.

The moon's influence proximate to satellite orbit apogee is emphasized for several reasons. First, as is well known to those of skill in the art, a velocity increment or decrement applied at apogee is directly relatable to a respective increase or decrease in perigee altitude. Second, the satellite is generally closer to the moon at apogee than at perigee. Third, the satellite is moving slower at apogee, and lingers near apogee for a longer period of time than at perigee due to the lower speed, allowing relatively more time for the moon's gravitational influence to work. Taking the above-mentioned factors together, the geometry represented in Detail B of FIG. 5, which is representative of the first 18-20 years following cessation of orbit maintenance, has been found to result in the moon's gravitational influence lowering perigee altitude as illustrated in FIG. 4 (Period I).

Turning to Detail C, as the argument of perigee rotates from 180 toward 90 degrees, the moon's gravitational influence due to relative proximity is stronger to accelerate the satellite velocity proximate to orbit apogee than to retard the satellite velocity. Thus, for the celestial geometry represented in Detail C of FIG. 5, which is representative of a second time period extending from about 20 to about 46 years following cessation of orbit maintenance, the moon's gravitational influence results in raising perigee altitude as illustrated in FIG. 4 (Period II).

Turning to Detail D, as the argument of perigee precesses from 90 toward 0 (360) degrees, the moon's gravitational influence due to relative proximity is stronger to retard the satellite velocity proximate to orbit apogee than to accelerate the satellite velocity. Thus, for the celestial geometry represented in Detail D of FIG. 5, which is representative of a third time period extending from about 46 years to about 70 years following cessation of orbit maintenance, the moon's gravitational influence results in lowering perigee altitude as illustrated in FIG. 4 (Period III).

In the absence of the present teachings, the orbit properties following cessation of orbit maintenance will continue to evolve into an indefinite future, well beyond the 100 year time frame illustrated. As a result, and as indicated in connection with FIG. 2, there will be multiple occasions when the satellite will pose a serious risk to satellites operating in GSO.

The present inventor, however, has appreciated that timely reentry of the satellite into the Earth's atmosphere, can be ensured by executing an orbit transfer maneuver, shortly after cessation of orbit maintenance maneuvers, to raise orbit apogee by as little as 4500 km. Referring again to FIG. 3, orbit apogee may be raised, in some implementations, by firing on-board thrusters proximate to orbit perigee, such that the satellite velocity is accelerated by about 65 m/sec. The orbit transfer maneuver may be accomplished by a single firing, or a series of firings proximate to orbit perigee, of chemical or low-thrust electric propulsion thrusters.

As a result of raising the orbit apogee, the satellite, when proximate to orbit apogee, will be appreciably closer to the moon with the result that the moon's gravitational affect to retard the satellite velocity near apogee during period I (FIG. 4) will be correspondingly increased. Consequently, the inventor has determined, the perigee will be lowered sufficiently such that, within a period significantly shorter than 25 years, perigee is sufficiently low to ensure that the satellite reenters Earth's atmosphere.

Figure 6A:
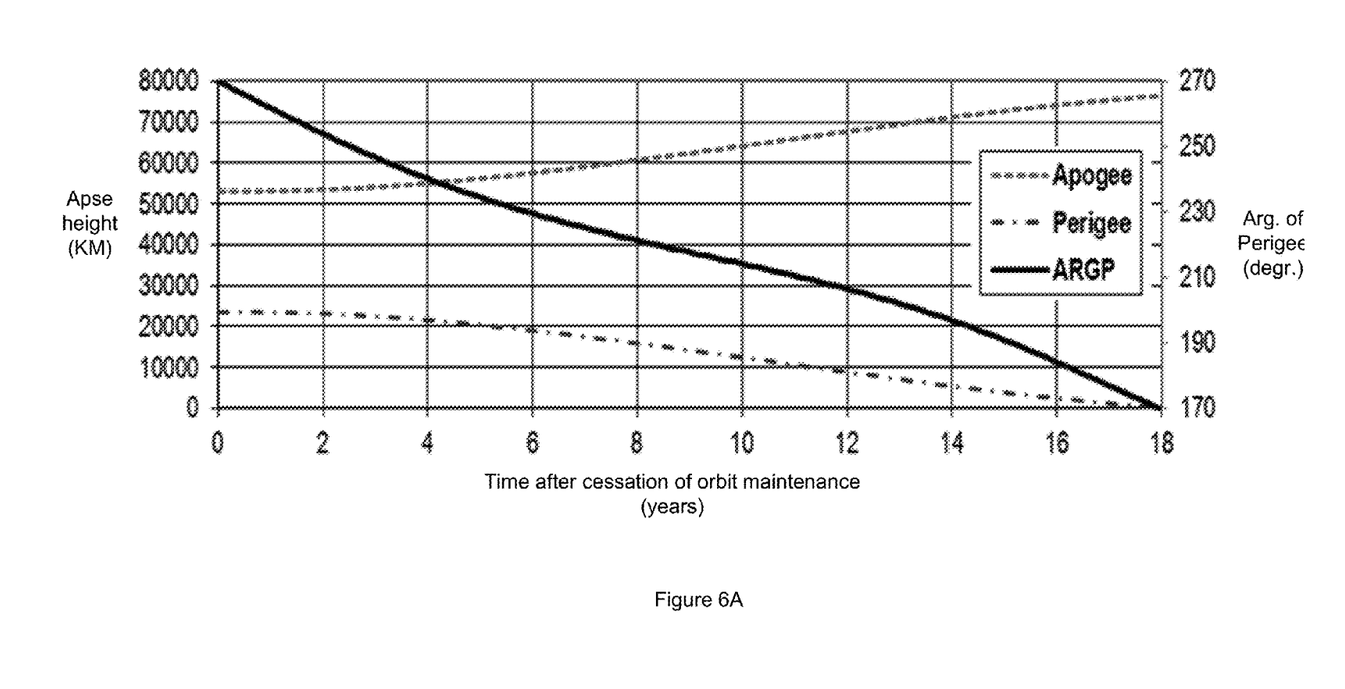
FIGS. 6A and 6B illustrate example simulations of orbital parameters versus time, subsequent to an orbit transfer maneuver according to an implementation.

FIG. 6A illustrates an example simulation of the orbital parameters versus time, subsequent to the proposed orbit transfer maneuver, assuming the RAAN is 0 (360) degrees. It will be noted that the initial apogee height shown in the example illustrated in FIG. 6A is approximately 53,000 km as compared to 48,000 km shown in the example of FIG. 4. This relatively modest increase in apogee height, which may be achieved at a propellant cost of less than one year's equivalent orbit maintenance, ensures that the decrease in perigee altitude during Period I is sufficient to result in satellite reentry.

Figure 6B:
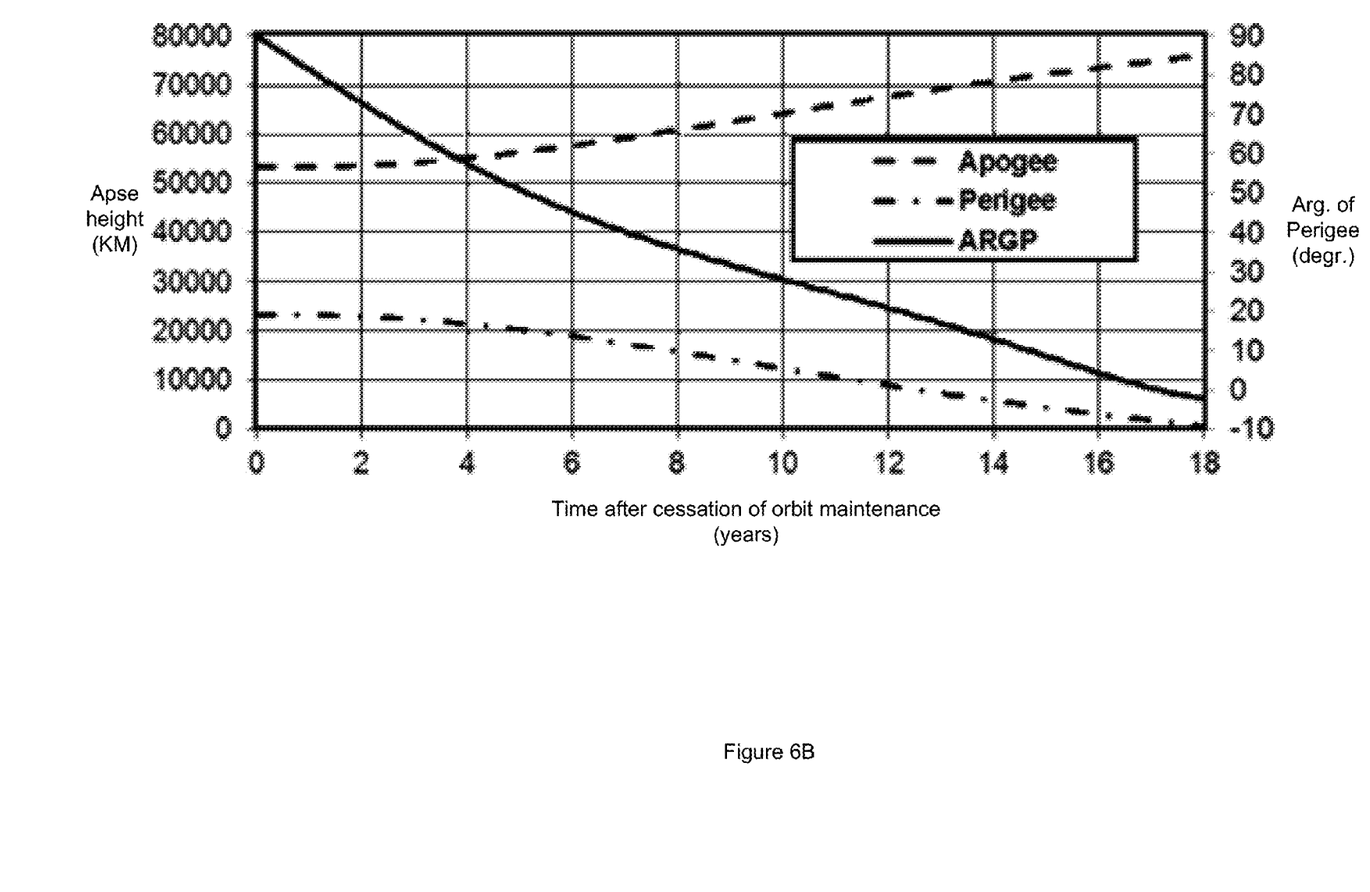

FIG. 6A illustrates a simulation of a case where the initial argument of perigee is approximately 270 degrees. As illustrated in FIG. 6B, the presently disclosed techniques have similarly been shown to be effective where the initial argument of perigee is approximately 90 degrees. An HIEO orbit with argument of perigee 90 degrees would be useful to provide coverage to Antarctica and other regions of high southerly latitude.

Figure 7:
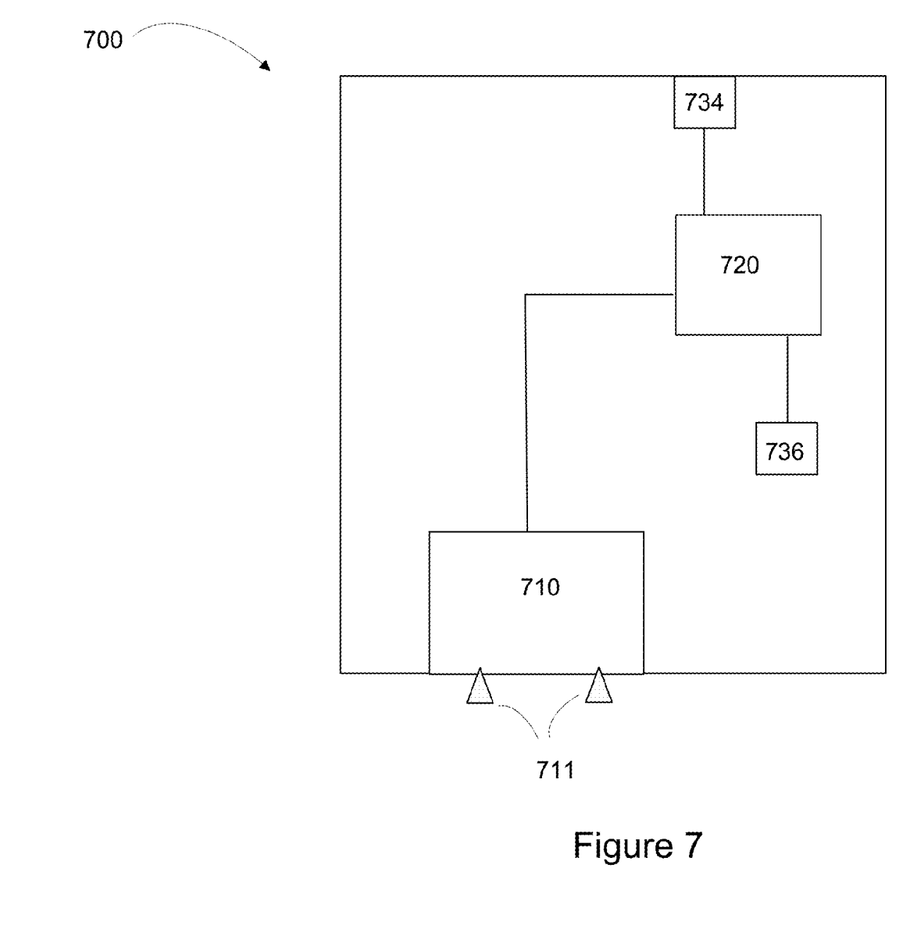
FIG. 7 illustrates an example block diagram of a spacecraft according to some implementations.

Referring now to FIG. 7, an example block diagram of a spacecraft 700 according to an embodiment is illustrated. Spacecraft 700 may include propulsion subsystem 710 and spacecraft controller 720. In an embodiment, for example, propulsion subsystem 710 may include propulsion equipment, such as tankage and control and service devices (not illustrated) and thrusters 711. Based on the respective primary energy source, each thruster 711 may be broadly categorized as either "chemical" or "electric".

Chemical thrusters, whether the propellant is solid or liquid, monopropellant or bipropellant, deliver thrust by converting chemical energy stored in the propellant to kinetic energy delivered to combustion products of the chemical propellant. Chemical thrusters, as the term is used herein, and in the claims, also include electrothermal thrusters such as arcjets that are configured to use electrical energy to increase the temperature, and, therefore, the velocity of the combustion products of chemical propellants.

In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a heavy noble gas, such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall Effect thruster, a wakefield accelerator, and a traveling wave accelerator, for example.

Referring still to FIG. 7, spacecraft controller 720 may include or be included in a spacecraft attitude and orbit control subsystem. In the illustrated example, spacecraft controller 720 is communicatively coupled with propulsion subsystem 710 and may be configured to control the operation of propulsion subsystem 710, including thrusters 711.

Spacecraft controller 720 may be configured to execute an orbit transfer maneuver by causing the propulsion subsystem to perform one or more operations. Each operation may include either or both of a chemical thruster firing and an electric thruster firing. The orbit transfer maneuver may include two or more thruster firings, each performed proximate to orbit perigee, separated by a respective intervening coast period.

Referring still to FIG. 7, spacecraft 700 may also include one or more star trackers 734 and/or inertial sensors 736. Inertial sensor 736 may include a digital integrating rate assembly (DIRA) or the like. In an embodiment, determination of spacecraft inertial attitude may be performed by spacecraft controller 720 using the output of star tracker 734 and/or inertial sensor 736. Determination of spacecraft inertial attitude may be performed using only the output of the star tracker 734 and/or inertial sensor 736.

Figure 8:
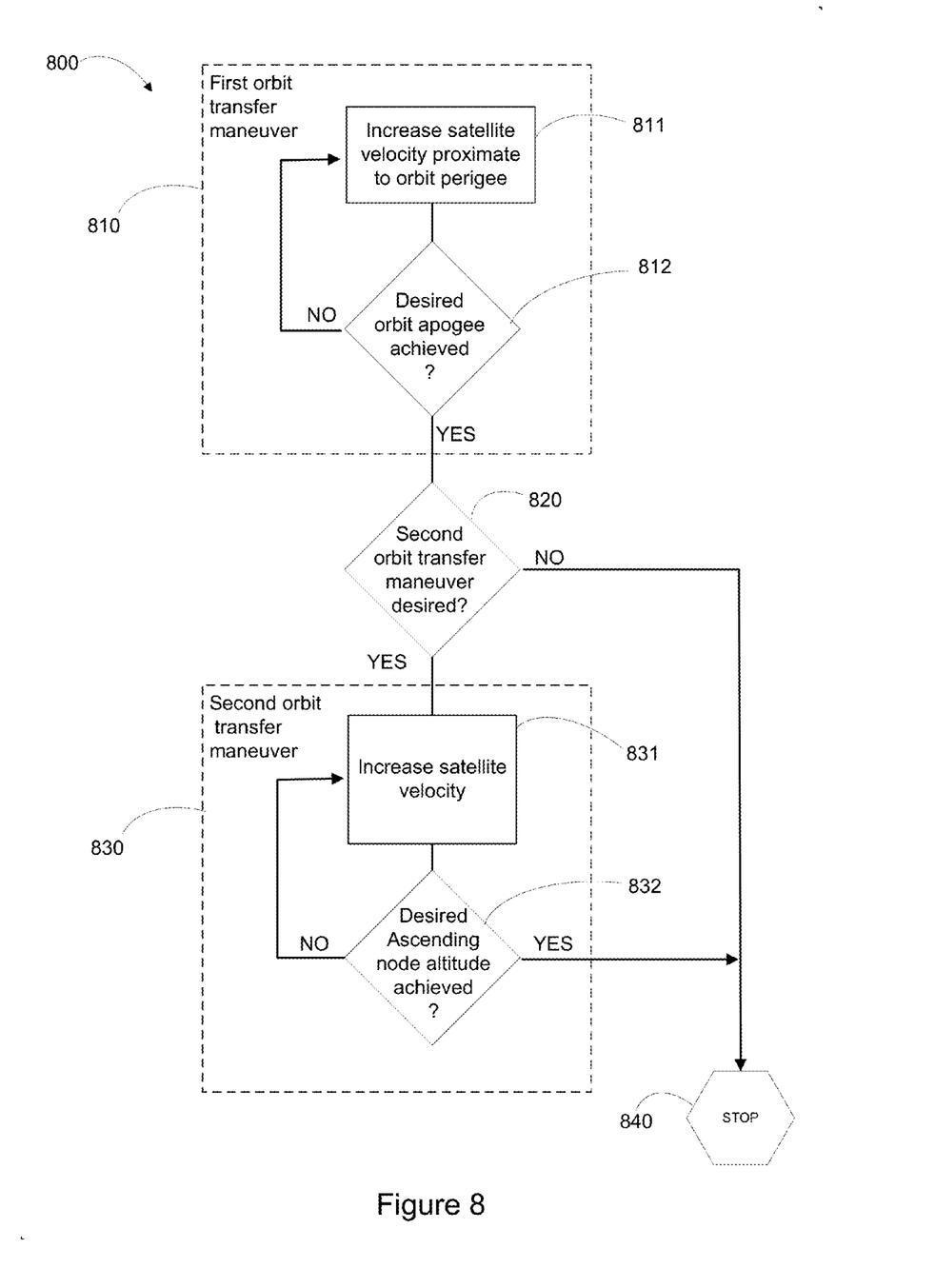
FIG. 8 illustrates a method of the orbit in an earth orbiting satellite according to some implementations.

Referring now to FIG. 8, a method 800 of deorbiting an earth-orbiting satellite will be described. At block 810, a first orbit transfer maneuver is performed. The first orbit transfer maneuver may include increasing the satellite velocity proximate to orbit perigee, block 811. It will be appreciated that such maneuver will be effective to raise orbit apogee. The satellite velocity may be increased by firing one or more thrusters on board the satellite. The thrusters may be chemical or electric thrusters as described hereinabove.

In some implementations, a desired velocity may be imparted in a single operation at orbit perigee. However, in other implementations a series of operations may be conducted, each operation being performed at respective orbit perigees. At block 812, a determination may be made whether or not a desired orbit apogee has been achieved. If the determination at block 812 is that the desired orbit apogee has not been achieved then the method returns to block 811.

As described hereinabove, the desired orbit apogee may be at least 4500 km above the apogee of the operational orbit. In some implementations, the desired orbit apogee may be approximately 5000 km above the apogee of the operational orbit. The resulting orbit may be referred to herein as the "first interim orbit". As indicated above in connection with FIG. 6, the interim orbit may be expected to naturally decay such that the satellite will reenter Earth's atmosphere no longer than 25 years after completion of the first orbit transfer maneuver.

On the other hand, if the determination at block 812 is that the desired orbit apogee has been achieved, the method may proceed to make a determination, at block 820, whether or not a second orbit transfer maneuver should be performed.

An objective of the second orbit transfer maneuver may be to minimize risk of a collision between the satellite and a satellite operating in geostationary orbit (GSO). The second orbit transfer maneuver may be performed following a period of time in which the first interim orbit is allowed to decay. The period of time contemplated by the presently disclosed techniques may be approximately one to two years.

Figure 2:
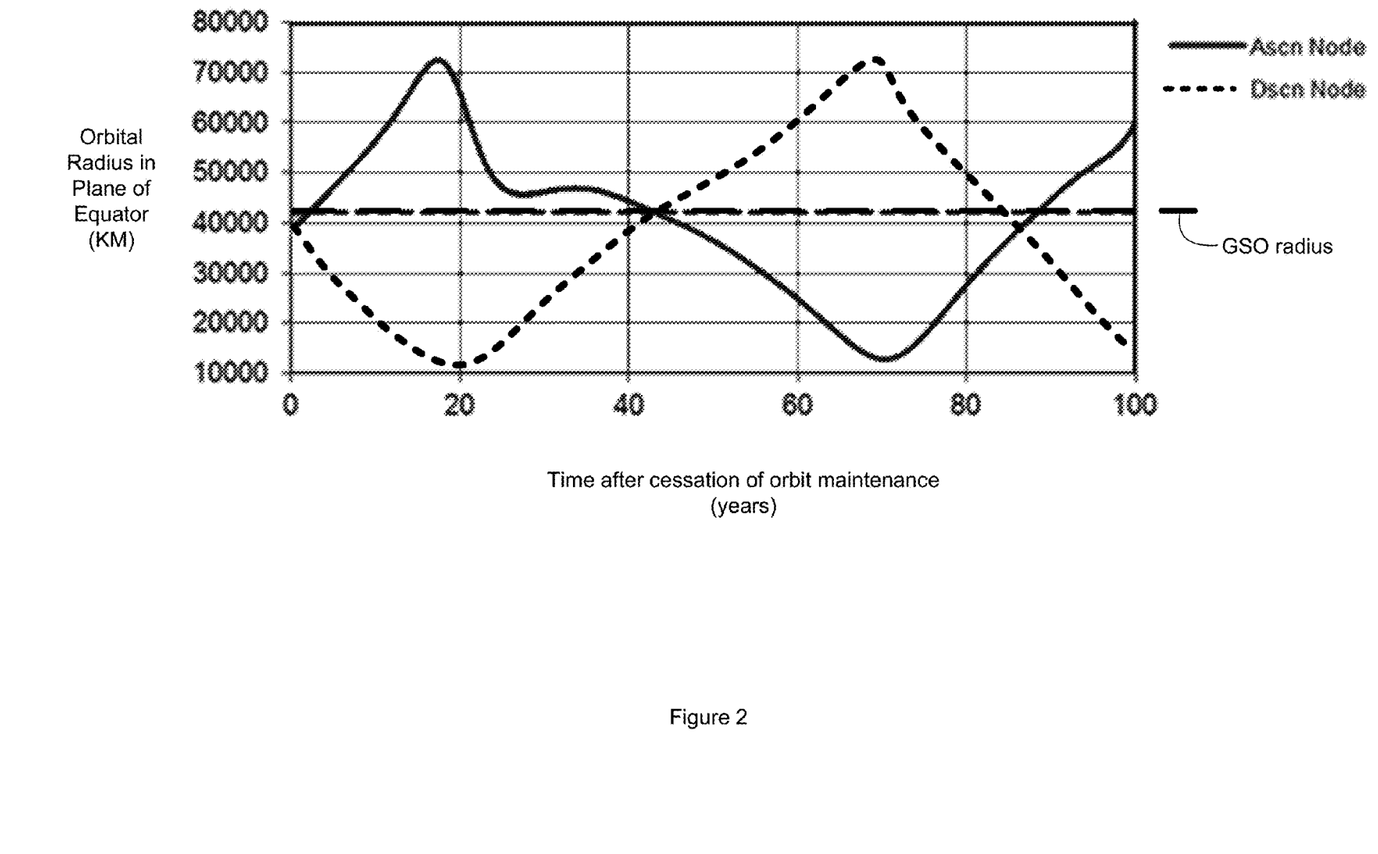
FIG. 2 illustrates additional orbital parameters of a satellite initially in an HIEO as a function of time in the absence of orbit maintenance maneuvers.

A better understanding of the second orbit transfer maneuver may be obtained by recalling that, as described in connection with FIG. 2, after cessation of orbit maintenance a retired spacecraft initially in a geosynchronous HIEO orbit poses a collision threat to spacecraft operating in GSO whenever an equatorial plane ascending or descending node occurs at a GSO altitude.

Figure 9:
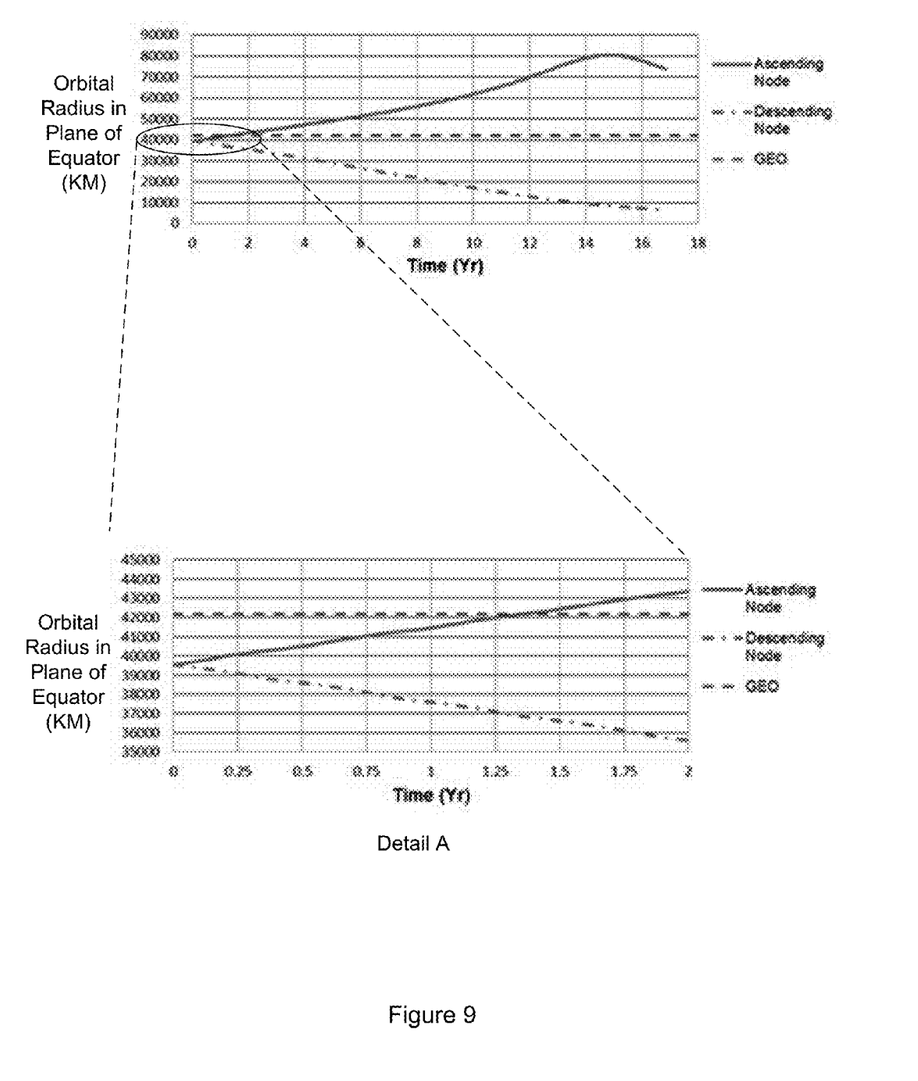
FIG. 9 illustrates a simulation of the ascending node radius and descending node orbital radius as a function of time subsequent to a first orbit transfer maneuver in the absence of a second orbit maintenance maneuver, according to some implementations.

Referring now to FIG. 9, it is illustrated that, approximately one year subsequent to the first orbit transfer maneuver, the ascending node of the satellite's decaying orbit may be expected to be proximate to the GSO radius. More particularly, in the illustrated simulation, referring now to Detail A of FIG. 9, collision risk is at a maximum at approximately 15 months after the first orbit transfer maneuver.

Figure 10:
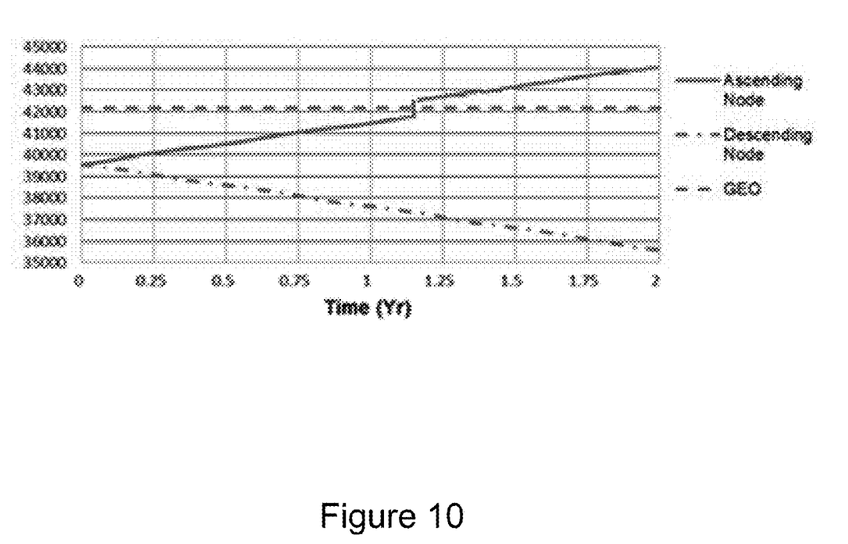
FIG. 10 illustrates a simulation of the ascending node radius and descending node orbital radius as a function of time according to some implementations.

In some implementations the second orbit transfer maneuver may be performed shortly before the period of time during which the risk of collision becomes significant. For example, referring now to FIG. 10, the second orbit transfer maneuver may result in an immediate increase in the altitude of the ascending node. In the illustrated simulation, the second orbit transfer maneuver raises altitude of the ascending node from a first value less than 42,000 km to a second value approximately 42,500 km. In some implementations, the decayed first interim orbit, immediately prior to the second orbit transfer maneuver, has an ascending node radius less than 42,160 km and the second interim orbit, immediately subsequent to the second orbit transfer maneuver, has an ascending node radius greater than 42,170 km.

In some implementations, the second orbit transfer maneuver may be performed after having placed the satellite into a housekeeping mode for 12 to 18 months after the first orbit raising maneuver. The second orbit raising maneuver may accomplish a sufficient increase in the altitude of the ascending node by imparting a prograde delta-v of approximately 7 m/s. In some implementations the prograde delta-v may be imparted by firing a chemical or electric thruster. In some implementations, the chemical or electric thrusters may be may be fired proximate to orbit perigee.

Referring again to FIG. 8, if the determination at block 820 is that a second orbit transfer maneuver is not desired method 800 may stop, block 840. On the other hand, if the determination at block 820 is that a second orbit transfer maneuver is desired, the method may proceed to block 830. The second orbit transfer maneuver may include increasing the satellite velocity, block 831. It will be appreciated that such maneuver will be effective to raise the altitude of the ascending node. In some implementations, increasing the satellite velocity includes imparting a prograde delta-v proximate to orbit perigee. In some implementations the prograde delta-v may be approximately 5-20 m/s. The satellite velocity may be increased by firing one or more thrusters on board the satellite. The thrusters may be chemical or electric thrusters as described hereinabove.

In some implementations, a desired velocity may be imparted in a single operation. However, in other implementations a series of operations may be conducted. For example, a series of operations may be conducted, each operation being performed at respective orbit perigees. At block 832, a determination may be made whether or not a desired ascending node altitude has been achieved. If the determination at block 832 is that the desired ascending node altitude has not been achieved then the method returns to block 831. If the determination at block 832 is that the desired ascending node altitude has been achieved then the method may stop, block 840.

Thus, satellite deorbit techniques, suitable for a satellite initially operating in a highly inclined elliptical orbit, have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method of deorbiting an earth-orbiting satellite comprising:
   executing a first orbit transfer maneuver that transfers the satellite from an operational orbit to a first interim orbit; wherein:
   the operational orbit is substantially geosynchronous and has (i) an inclination of greater than 70 degrees; (ii) a nominal eccentricity in the range of 0.25 to 0.5; (iii) an argument of perigee of approximately 90 or approximately 270 degrees; (iv) a right ascension of ascending node of approximately 0; and (v) an operational orbit apogee altitude; and
   the first interim orbit has an initial second apogee altitude that is at least 4500 km higher than the first apogee altitude, and the interim orbit naturally decays, subsequent to the orbit transfer maneuver, such that the satellite will reenter Earth's atmosphere no longer than 25 years after completion of the orbit transfer maneuver.

2. The method of claim 1, wherein executing the first orbit transfer maneuver includes increasing the satellite velocity, proximate to orbit perigee, by more than 60 m/sec.

3. The method of claim 1, wherein executing the orbit transfer maneuver includes increasing the satellite velocity, proximate to orbit perigee, by approximately 65 m/sec.

4. The method of claim 1, wherein the first interim orbit has an initial second apogee altitude that is approximately 5000 km higher than the operational orbit apogee altitude.

5. The method of claim 1, wherein the right ascension of ascending node is 0+/−20 degrees.

6. The method of claim 1, wherein the operational orbit has an orbital period of approximately 23.93 hours.

7. The method of claim 1, wherein executing the first orbit transfer maneuver includes at least one firing of a chemical or electric thruster proximate to orbit perigee.

8. The method of claim 7, wherein executing the first orbit transfer maneuver includes a plurality of thruster firings.

9. The method of claim 1, further comprising:
   executing, following a period of time in which the first interim orbit is allowed to decay, a second orbit transfer maneuver that transfers the satellite from the decayed first interim orbit to a second interim orbit, wherein the decayed first interim orbit has an ascending node radius less than 42,160 km and the second interim orbit has an ascending node radius greater than 42,170 km.

10. The method of claim 9, wherein executing the second orbit transfer maneuver includes increasing the satellite velocity, proximate to orbit perigee, by approximately 7 m/sec.

11. An earth-orbiting satellite comprising a propulsion subsystem and a spacecraft controller, the spacecraft controller configured to:
   cause the propulsion subsystem to execute a first orbit transfer maneuver that transfers the satellite from an operational orbit to an interim orbit; wherein:
   the operational orbit is substantially geosynchronous and has (i) an inclination of greater than 70 degrees; (ii) a nominal eccentricity in the range of 0.25 to 0.5; (iii) an argument of perigee of approximately 90 or approximately 270 degrees; (iv) a right ascension of ascending node of approximately 0; and (v) an operational orbit apogee altitude; and
   the interim orbit has an initial second apogee altitude that is at least 4500 km higher than the first apogee altitude, and the interim orbit naturally decays, subsequent to the first orbit transfer maneuver, such that the satellite will reenter Earth's atmosphere no longer than 25 years after completion of the first orbit transfer maneuver.

12. The earth-orbiting satellite of claim 11, wherein the first orbit transfer maneuver includes increasing the satellite velocity, proximate to orbit perigee, by more than 60 m/sec.

13. The earth-orbiting satellite of claim 11, wherein the orbit transfer maneuver includes increasing the satellite velocity, proximate to orbit perigee, by approximately 65 m/sec.

14. The earth-orbiting satellite of claim 11, wherein the first interim orbit has an initial second apogee altitude that is approximately 5000 km higher than the operational orbit apogee altitude.

15. The earth-orbiting satellite of claim 11, wherein the right ascension of ascending node is 0+/−20 degrees.

16. The earth-orbiting satellite of claim 11, wherein the operational orbit has an orbital period of approximately 23.93 hours.

17. The earth-orbiting satellite of claim 11, wherein the first orbit transfer maneuver includes at least one firing of a chemical or electric thruster proximate to orbit perigee.

18. The earth-orbiting satellite of claim 17, wherein the first orbit transfer maneuver includes a plurality of thruster firings.

19. The earth-orbiting satellite of claim 11, wherein the spacecraft controller is further configured to:

execute, following a period of time in which the first interim orbit is allowed to decay, a second orbit transfer maneuver that transfers the satellite from the decayed first interim orbit to a second interim orbit, the decayed first interim orbit having an ascending node radius less than 42,160 km and the second interim orbit has an ascending node radius greater than 42,170 km.

20. The earth-orbiting satellite of claim 19, wherein the second orbit transfer maneuver includes increasing the satellite velocity, proximate to orbit perigee, by approximately 7 m/sec.

* * * * *